May 4, 1954

J. A. BRUSTMAN 2,677,815

PHOTOELECTRIC CHECKING CIRCUITS

Filed Dec. 4, 1951

INVENTOR.
JOSEPH A. BRUSTMAN

BY

Ralph E. Bitner

ATTORNEY

May 4, 1954

J. A. BRUSTMAN 2,677,815

PHOTOELECTRIC CHECKING CIRCUITS

Filed Dec. 4, 1951

INVENTOR.
JOSEPH A. BRUSTMAN

BY Ralph E. Bitner

ATTORNEY

May 4, 1954    J. A. BRUSTMAN    2,677,815
PHOTOELECTRIC CHECKING CIRCUITS
Filed Dec. 4, 1951    5 Sheets-Sheet 3

INVENTOR.
JOSEPH A. BRUSTMAN
BY Ralph E. Bitner
ATTORNEY

May 4, 1954  J. A. BRUSTMAN  2,677,815
PHOTOELECTRIC CHECKING CIRCUITS
Filed Dec. 4, 1951  5 Sheets-Sheet 4

INVENTOR.
JOSEPH A. BRUSTMAN
BY
Ralph E. Bitner
ATTORNEY

May 4, 1954   J. A. BRUSTMAN   2,677,815
PHOTOELECTRIC CHECKING CIRCUITS
Filed Dec. 4, 1951                                    5 Sheets-Sheet 5

INVENTOR.
JOSEPH A. BRUSTMAN
BY Ralph E. Bitner
ATTORNEY

Patented May 4, 1954

2,677,815

UNITED STATES PATENT OFFICE 2,677,815

PHOTOELECTRIC CHECKING CIRCUITS

Joseph A. Brustman, Fairfield, Conn., assignor to Remington Rand Inc., New York, N. Y., a corporation of Delaware Application December 4, 1951, Serial No. 259,865

12 Claims. (Cl. 340—213)

This invention relates to photoelectric checking systems and has particular reference to the checking and testing of photoelectric cells which are employed in data card sensing. While the invention is subject to a wide range of applications, it is especially suited for use in data card machines where information is obtained from the perforations cut in data cards and used for calculating systems and tabulator work. As used throughout the specification and claims, the term "photoelectric cell" refers not only to the usual type of vacuum tube cell but also to any related transducer which is sensitive to light and produces electrical variations in response to light variations.

Photoelectric cells have been used for sensing data cards and also for sensing the presence of light-masking material in many industrial applications. However, they have a definite useful life and when they go bad, there is no visual indication of the transition. The photoelectric material on the cathode may be damaged or the tube may lose its vacuum. In either case, only an electrical test will indicate the lack of sensitivity. The present invention contemplates testing each photoelectric cell for its response to light and also for its lack of response when dark. These two tests are made after each data card has been sensed. In the case of a failure, a mechanical clutch may be disengaged to stop the sensing operation or some other form of indicator may be operated to show the operator of the machine that something is wrong.

One of the objects of this invention is to provide an improved photoelectric checking system operating intermediate sensing of each data card, thereby providing instant check on the photoelectric system.

Another object of the invention is to provide a checking system which tests the photoelectric amplifying system and the decoding systems employed in conjunction with the sensing of the data cards.

Another object of the invention is to provide a checking system which occupies little space and consumes a very short time for its operation.

Another object of the invention is to provide a photoelectric checking system which requires few extra tubes and circuits for its operation.

The invention comprises a series of slots and masks on a sensing drum which applies one or more cycle of luminous energy to all the sensing cells. Each of these cycles includes a period of light and a period of darkness. The system also includes the usual photoelectric amplifiers and decoding system used in the sensing operation. The decoding system is employed to produce a first electric signal when all of the cells are conducting and for producing a second electric signal when all of the cells are non-conducting. These two signals are applied to a counting circuit comprising a plurality of trigger circuits which are actuated by the two signals and caused to transfer their conductance from one set of electrodes to another. If a complete set of counts is received, the sensing mechanism continues to operate but if an incomplete set of counts is received, a signal is produced indicating that all the cells are not working properly and the machine should be stopped.

The invention also contemplates the use of an automatic clutch which disconnects the sensing mechanism from a driving motor whenever a full count is received.

For a better understanding of the present invention together with other and further objects thereof, reference is made to the following description taken in connection with the accompanying drawings.

Figure 1:
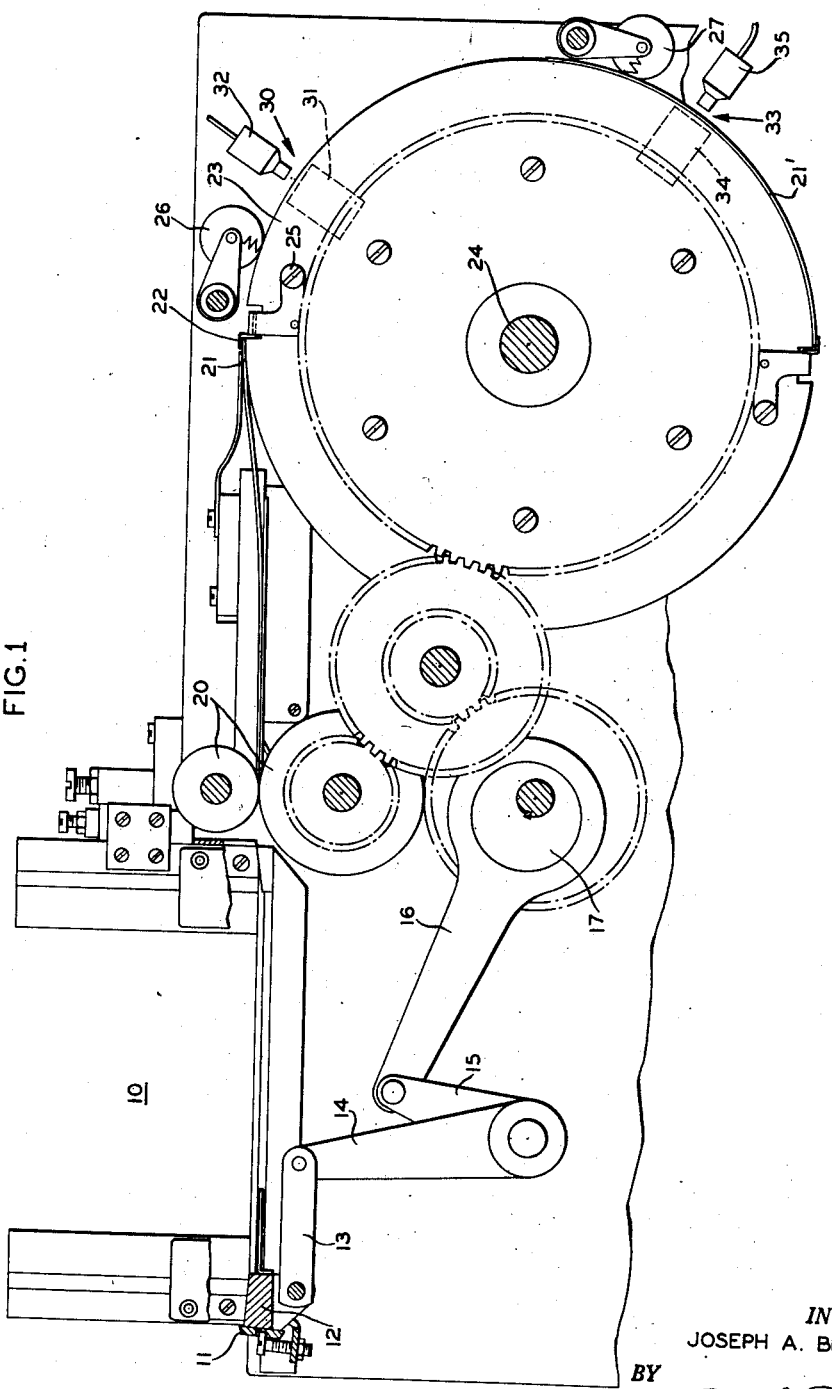
Fig. 1 is a side view, partly in section, of the sensing mechanism and includes a sensing drum and a card feeding mechanism.

Referring now to Fig. 1, the sensing mechanism includes a card chamber 10 where the data cards may be stacked preliminary to the sensing operation. A picker knife 11 is secured to a movable base 12 which may be moved into engagement with the lowest card in the stack by means of a mechanical oscillating system which includes a link 13, rockable levers 14 and 15, and an eccentric arm 16 which is mounted on an eccentric hub 17. When the picker knife 11 is moved toward the rear of the machine, it engages the lowest card in the stack and forces it through a throat to a pair of card rollers 20. These rollers move the card into the position shown in Fig. 1 where the front edge of the card 21 is forced into engagement with a clamp 22 which is spring mounted on the periphery of a card sensing drum 23. This drum rotates continually on a shaft 24 and has a periphery somewhat longer than the length of four cards. When the drum 23 advances to the position just prior to that shown in Fig. 1, clamp 22 is held in a disengaged position by a cam arrangement inside the drum (not shown). As soon as the card is forced under the clamp, the clamp is rotated about a pivot 25 so that the card is firmly held by its front edge and thereafter, for one-half revolution of the sensing drum, is securely held by the clamp and is pressed against the periphery of the drum by idling rollers 26 and 27.

During the passage of the card around the drum it passes through a sensing position 30. A source of light 31 is positioned under the drum surface and light from the source is directed outwardly, shining through holes in the card and being received by a set of photoelectric cells 32 mounted outside of the drum but in close proximity to the drum surface. The cards used in this sensing system are the usual data cards punched in the well-known Powers code and are divided into two fields or areas, an upper and a lower. The cards have 45 columns in each field and each column contains six data positions. The first sensing arrangement 30 is used to sense the data holes in the upper field and a second sensing position 33 is employed to sense the data holes in the lower field. The sensing position 33 is similar to the first position 30 and contains a source of light 34 and a series of photoelectric cells 35. These two sensing positions are mounted 90° apart around the periphery of the sensing drum 23.

Figure 2:
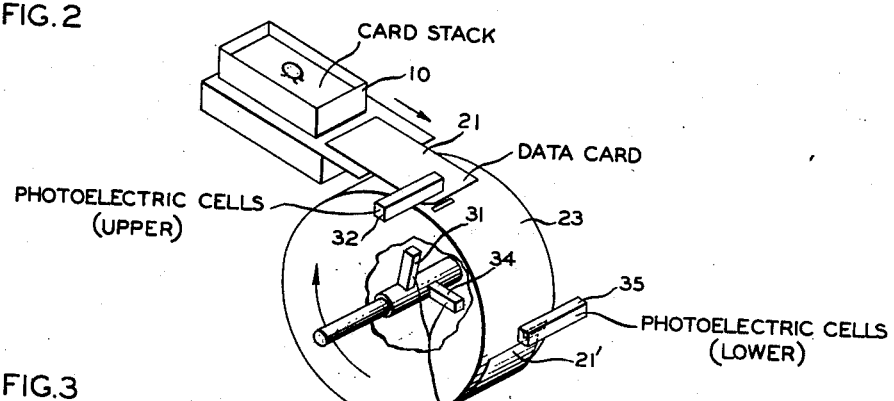
Fig. 2 is an isometric view, greatly simplified, indicating the path of the data card around the sensing drum and showing one of the slots employed to illuminate all six of the photoelectric cells in one group.

The simplified drawing Fig. 2 shows the card stack 10 and a data card 21 which has just entered the first sensing position and is under a series of photoelectric cells 32. Another card 21' is shown leaving the second sensing position, having just passed under the collection of photoelectric cells 35. Light sources 31 and 34 are indicated in this figure mounted on shaft 24. The first set of photoelectric cells 32 covers only the upper half of the data card and senses positions 1 to 45 inclusive. The second set of photoelectric cells 35 senses the lower half of the data card which includes data positions 46 to 90, inclusive. The two sensing positions are arranged slightly less than 90° apart around the periphery of the drum and are spaced so that the second set of cells starts sensing column 46 in regular sequence after the first set of cells 32 has sensed column 45. After a data card has passed the second set of photoelectric cells 35 and before a following card has entered the sensing position 30, a series of light and dark illumination periods is applied to each group of cells in a sequence arrangement which results in two cycles of luminous energy.

Figure 4:
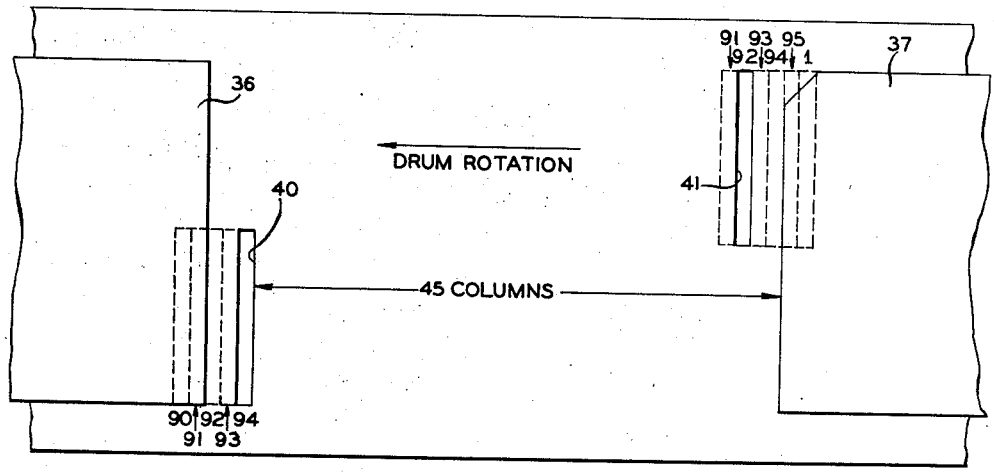
Fig. 4 is a plan view showing a section of the sensing drum in development.

The arrangement of slots and masks are better illustrated in Fig. 4 where a development of the drum periphery is shown in greater detail. In this drawing a data card 36 is shown leaving the second sensing position while another data card 37 is shown entering the first sensing position. The data card is arranged so that the last or ninetieth column perforations appear in that area of the card 36 designated by the figure 90. Between this column and the right-hand edge of the card no data holes are ever punched and, therefore, it always produces a period of darkness as sensed by the photo cells. Two additional column areas 92 and 93 are indicated on the drum periphery and also act as a mask. Column 94, however, comprises a cut-out portion 40 and when this slot passes beneath the photoelectric cells, all six cells are illuminated. A similar arrangement comprising a single slot 41 in the ninety-second position is cut in the drum periphery two column spaces away from the leading edge of card 37. The first data column of card 37 is indicated in Fig. 4 by the numeral 1 and between this data column and the leading edge of the card there is a card area 95 which never contains any data holes. Columns 93 and 94 represent masked column areas between the open slot 41 and the leading edge of the card.

In order to determine the sequence of pulses as delivered to the amplifying system, it must be understood that the two sensing systems 30 and 33 are spaced forty-five columns apart and when one set of cells is above column 91 on card 36, the other set of cells is above column 91 adjoining open slot 41 in the position of column 92. In this position (column 91) both sets of cells are blanked off and receive no illumination. When the drum rotates so that columns 92 are below the cell positions, then all six of the photo cells in the first position will receive light through slot 41 while the six cells in group 35 are in darkness. When the drum rotates to column position 93, both groups of cells are again in darkness. Another increment of rotation to position 94 permits all six cells in group 35 to receive illumination through slot 40 while the first set of cells 32 are in darkness. Columns 95 produce no illumination for either group of cells and then column 1 of card 37 may or may not produce light for one or more of the photoelectric cells in group 32, depending upon the data punched in the card.

Figure 3:
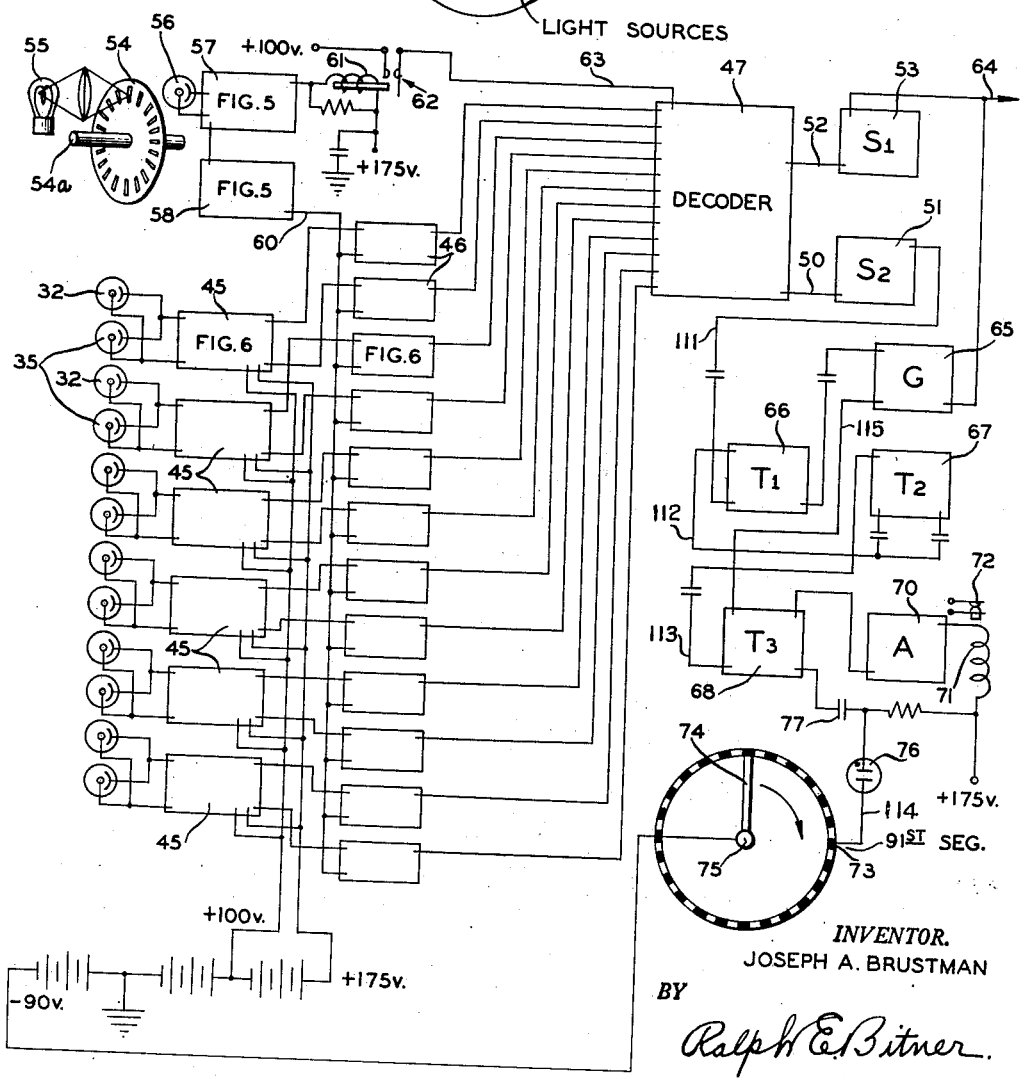
Fig. 3 is a block diagram of the entire circuit showing the photoelectric cells, the decoder and the counting circuit.
Figure 6:
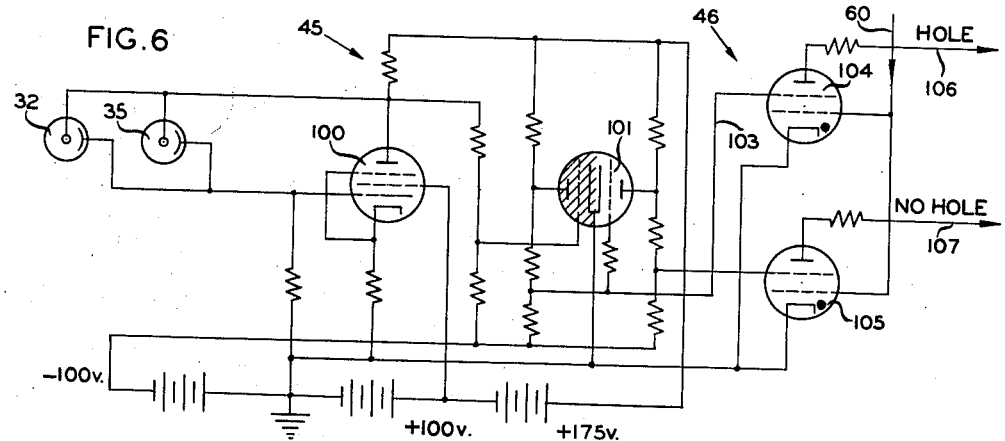
Fig. 6 is a schematic diagram of connections of the photoelectric cell amplifier.

As indicated in Fig. 6, the two photoelectric cells for each data position are parallel connected to each other. Therefore, the sequence just outlined produces in the photoelectric cell amplifier a period of illumination at position 92, a period of darkness at position 93, a second period of illumination at position 94 and a second period of darkness at position 95. It is this double cycle of illumination and darkness which is carried through the amplifying and decoding systems and is impressed on a counting system T1, T2 and T3 to determine the workability of all the photoelectric cells. Fig. 3 illustrates the entire circuit in block form and shows the two groups of photoelectric cells 32 and 35 connected to the input circuits of six amplifiers 45 which in turn are connected to twelve output circuits 46. The wiring details of amplifiers 45 and 46 are shown in Fig. 6. The output from amplifiers 46 are applied to a decoding circuit 47 which decodes the Powers code and produces signals for a utilization circuit. One electric pulse is produced for each numeral from zero to nine and for each letter of the alphabet. The output circuits carrying these signals are not shown in Fig. 3 since they do not represent part of this invention. The decoding circuit 47 may be a system of relays, a system of neon lamps or a system which uses a number of rectifier components. A decoder using rectifiers has been described in an article published in the Proceedings of the Institute of Radio Engineers in June 1949, page 139. The decoding system is arranged so that whenever all six of either group of photoelectric cells receive full illumination, a pulse will be transmitted over conductor 50 to a trigger circuit 51 and whenever all the photo cells are in darkness a similar pulse will be transmitted over conductor 52 to a trigger circuit 53.

It has been found necessary to provide an energizing pulse to the decoder and to the amplifier components 46 so that the period of transition from one column position to another will have no effect from the output circuit. This energizing circuit is controlled by a slotted wheel 54 (Fig. 3) revolving in synchronism with the sensing drum 23. A source of light 55 illuminates the slots in wheel 54 and the transmitted pulses of illumination are applied to a photoelectric cell 56. The output from the photoelectric cell 56 is applied to amplifying systems 57, 58 which are shown in greater detail in Fig. 5 and one output from this amplifier is applied over conductor 60 to all the twelve amplifier units 46. Another output from amplifier 57 is applied to a fast vibrating relay 61 which produces a closed circuit by means of contacts 62. These contacts connect a 100-volt supply to the decoding system 47 by means of conductor 63.

The slots in wheel 54 are arranged so that light is transmitted to the photoelectric cell 56 while the card on the sensing drum 23 passes over the central portion of the sensing position. Wheel 54 contains ninety-five slots corresponding to the ninety code positions in the data card plus the five positions between cards as illustrated in Fig. 4. Trigger circuits 51 and 53 are commonly called Schmitt triggers and comprise two triode electron discharge devices, one of which triodes is always conducting while the other triode is non-conducting. By raising the voltage a predetermined amount on the input conductors 50, 52, conductance is shifted from one triode to the other and upon removal of the input voltage, conductance immediately shifts back to its normal position. Since trigger stage 53 operates when all photoelectric cells are dark, an indication will be received over conductor 52 each time a blank column is sensed in the card. The transmittal of this information designating a space is necessary during the normal card sensing process and such information is transmitted to the printing or tabulating circuit over a conductor 64. During the normal card sensing procedure these space pulses are not transmitted to the counting circuit as represented by triggers T1, T2 and T3 because a gate circuit 65 is closed and information from trigger circuit 53 will not be transmitted through it.

The counting circuit for determining the workability of photoelectric cells 32, 35 include three trigger circuits 66, 67 and 68. These are the usual double triode type of trigger circuits in which one triode is always conducting and the other is non-conducting. A transfer of conductance from one triode to another is accomplished by actuating the circuit with a short negative pulse. When trigger circuits of this type have been actuated, the conductance shifts from one triode to another and remains in the actuated condition until a second negative pulse has been received, transferring it back to its original position. The counting circuit also includes an amplifier stage 70 which is convenient but not necessary to its operation. The output of amplifier 70 is connected to a relay coil 71 and relay contacts 72 are part of a signal circuit which will either operate a signal 120 or else disengage a clutch 121 to stop the machine. Since this counting circuit operates only between the sensing of two cards, it is held inoperative during the card sensing operation and energized into operating condition by a negative pulse which is transmitted through a commutator segment 73. A commutator arm 74 rotates on shaft 75 which may be directly connected to shaft 24 operating the sensing drum or to shaft 54A which turns the slotted wheel 54. The voltage pulse sent through segment 73 is transmitted through a neon lamp 76 and through a blocking condenser 77 to trigger stage 68 to actuate it and at the same time open gate stage 65 by increasing the voltage on conductor 115, placing the counting circuit in the operative condition. The details of the counting circuit operations will be described hereinafter.

Figure 5:
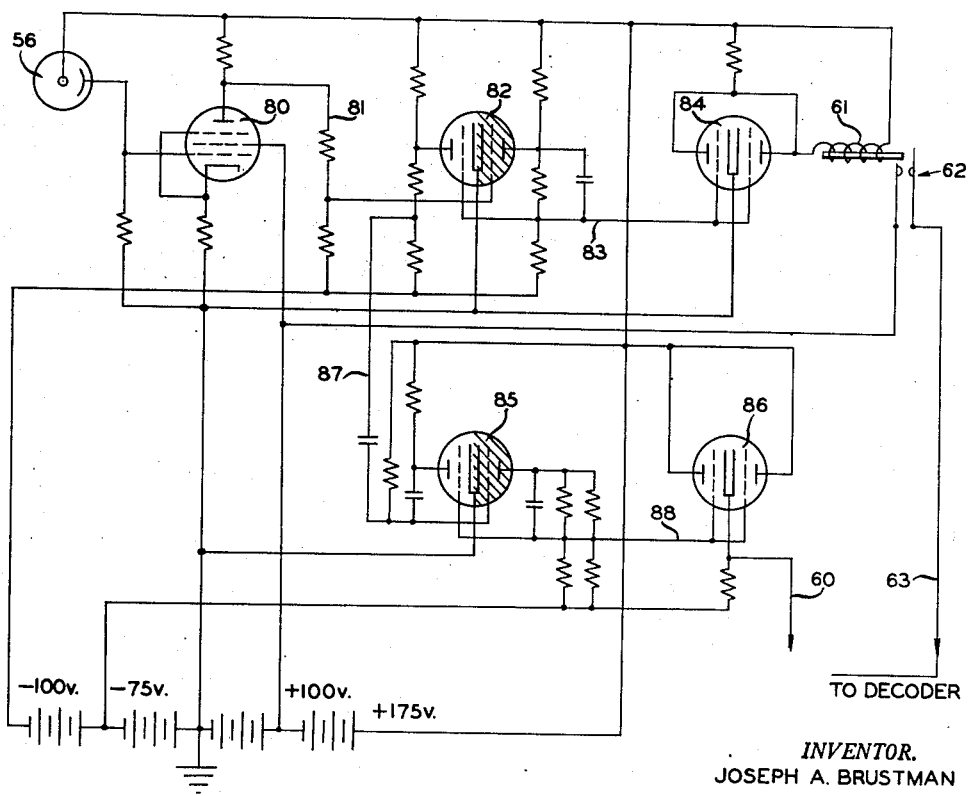
Fig. 5 is a detailed diagram of connections of a control system which is employed to energize the decoding system each time a column is sensed in the data card.

The circuit shown in Fig. 5 includes the photoelectric cell 56 and the amplifiers 57 and 58 shown in block form in Fig. 3. The amplifier circuit includes a pentode tube 80, a Schmitt trigger 82 and an unbalanced trigger circuit 85, sometimes called a flip-flop, and two output amplifier stages 84 and 86. Amplifier 84 is connected to a relay winding 61 and makes and breaks contacts 62 when the tube circuit is actuated. Output amplifier 86 is a cathode-follower stage and transmits pulses over conductor 60 to the gas-filled amplifier stages shown in detail in Fig. 6. The photoelectric cell 56 receives flashes of light through rotating slotted disc 54. These periods of illumination are converted into voltage pulses which are amplified by the pentode 80 and transmitted by conductor 81 to Schmitt trigger 82 which is normally conducting on the right side. When the photoelectric cell is illuminated, the passage of current through the tube causes the control grid of tube 80 to be increased in potential, thereby increasing the flow of current through the tube and lowering the potential of the anode. This causes the control electrode of the right triode in tube 82 to receive a negative pulse and conductance is transferred to the left side. This transfer raises the potential of the right anode and a positive pulse is applied to both control electrodes in amplifier stage 84, thereby drawing current through the tube through winding 61 and making contacts 62. When these contacts are made, a potential increase of 100 volts is applied to conductor 63 which goes to the decoder circuit 47.

The decrease of potential on the left anode in tube 82 is also communicated over conductor 87 to the unbalanced trigger circuit 85. The conductance in this tube is transferred for a short interval of time to the left triode and then the conductance is transferred back again due to the operation of the circuit components. This fluctuation produces a square top voltage wave which is applied over conductor 88 through cathode-follower amplifier 86 and results in a square top wave being applied to all the amplifier stages 46 by way of conductor 60. The series of light and dark flashes which are applied to the photoelectric cell 56 are synchronized with the column positions of the data cards as they are sensed by the sensing drum. The circuit shown in Fig. 6 is the amplifier which receives electric impulses from the two groups 32, 35 of six photoelectric cells as indicated in Fig. 3 and also in Fig. 6. Corresponding photo cells from each group are connected in parallel with each other.

The amplifier which receives the electric output from the photo cells comprises a first pentode tube amplifier 100, a double triode amplifier stage 101, and two gas-filled discharge devices 104 and 105. When light from a data hole is impressed on one of the tubes 32 or 35, the current through its electrodes is increased and the control electrode of amplifier tube 100 is increased in value, thereby sending a relatively large current through the tube and reducing the potential of the anode. This action is communicated to the left control electrode of the Schmitt trigger stage 101 and conductance is thereby shifted from the left to the right side. This action increases the potential on conductor 103 and places the tube 104 in a firing condition. Then when the control potential is applied over conductor 60, the tube is fired and a negative potential is sent over conductor 106 to the decoding matrix. When there is no hole in the data card and photoelectric cells 32 and 35 are in darkness, the anode of stage 100 will be at its most positive value and Schmitt trigger stage 101 will retain its conductance on the left side. This puts a negative potential on the screen grid of tube 104 but puts a positive potential on the screen grid of tube 105. In this condition when the voltage pulse is applied over conductor 60, tube 105 will be fired and a large negative pulse will be sent out over conductor 107 to the decoding matrix, thereby indicating that no hole is present in the card in this position.

Figure 7:
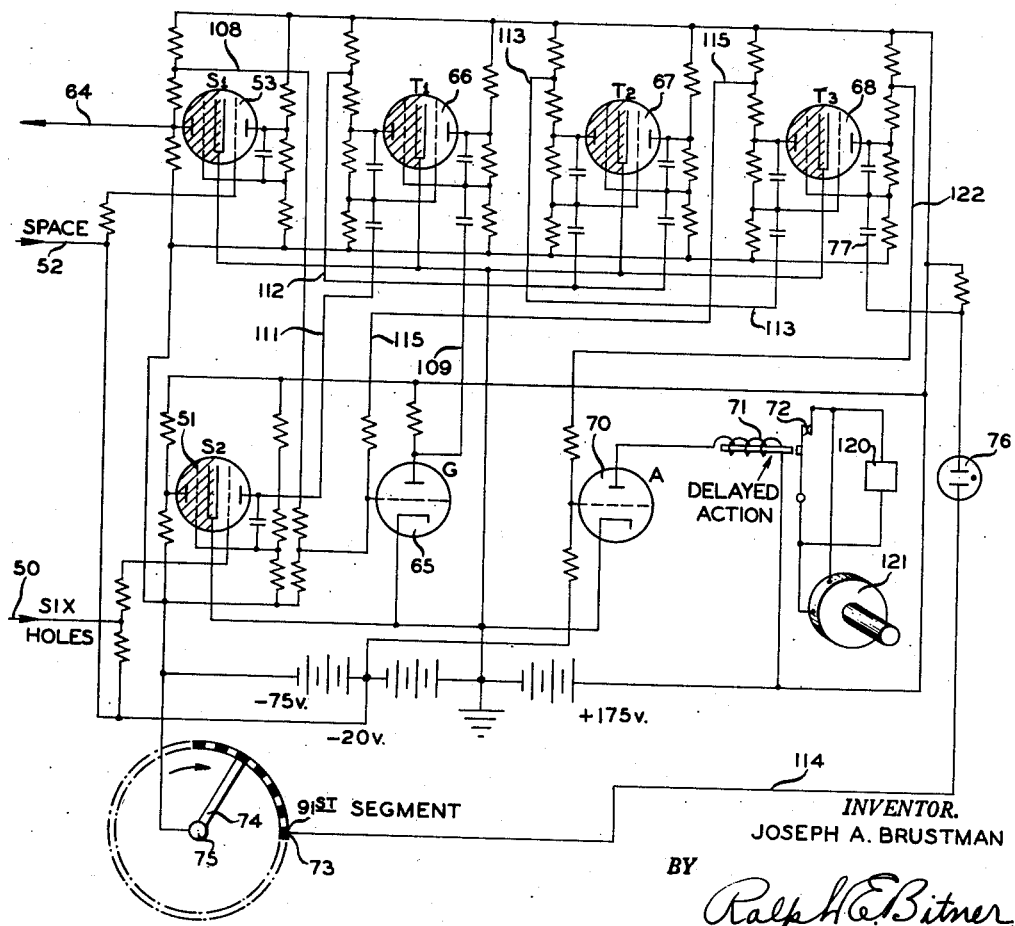
Fig. 7 is a schematic diagram of connections of the counting circuit which receives electric pulses from the decoding system, counts the pulses and applies the results to a signal circuit.

The circuit shown in Fig. 7 represents the details of the stages connected to the output of the decoder matrix 47 and were shown in block form in Fig. 3. The circuit contains two Schmitt triggers 51 and 53, a gate stage 65, three trigger stages 66, 67, and 68 and an amplifier stage 70. The Schmitt trigger 53 is actuated only when all six photo electric cells are in darkness, thereby indicating a space. The actuation of this stage sends a positive potential over conductor 108 to a voltage divider connected to the control electrode of gate stage 65. If the gate stage is open, a pulse is transmitted through the gate by way of conductor 109 to actuate the first trigger stage 66. If the gate stage is closed, nothing happens. When all six photoelectric tubes are illuminated, an increase in potential is sent over conductor 50 to Schmitt trigger stage 51, thereby transferring its conductance to the right side and sending a negative voltage pulse over conductor 111 to the right-hand control electrode of the first trigger stage 66. If such a pulse is received by the trigger stage when in its normal condition, nothing happens since the pulse simply makes a negative electrode more negative. On the other hand, if trigger stage 66 had first been actuated by a pulse through stages 53 and 65, then the actuation of stage 51 will transfer the conductance back to normal.

The first trigger stage 66 has the usual coupling conductor 112 so that when its conductance is normalized, a negative pulse is sent over this connection to both control electrodes of the second trigger stage 67, actuating this stage and transferring its conductance from one side to the other regardless of the previous conductive position. The second trigger stage 67 contains a similar coupling conductor 113 which is connected to the right-hand control electrode of the third trigger stage 68 and whenever the conductance of stage 67 is transferred from right to left, a negative voltage is sent over conductor 113 to actuate trigger stage 68 if the conductance had been previously transferred to the right side.

When the counting circuit as shown in Fig. 7 is in its normal or zeroized condition, the gate stage 65 is closed and the five trigger stages are all conducting on the left side, the amplifier stage 70 is conducting and contacts 72 are held open. This zero or normalized condition is maintained throughout the sensing of the data card except for the sensing of a space and the actuation of stage 53. The actuation of this stage during the normal sensing operation causes a positive pulse to be sent over conductor 64 to other parts of the circuit but since the gate stage is closed, the counting circuit is not affected. When the ninety-first column on the sensing drum is reached, a commutator arm 74 makes contact with a segment 73 and a negative potential of 75 volts is transmitted over conductor 114 through a neon lamp 76, lighting the lamp and impressing a negative potential on the left control electrode of the third trigger stage 68 through blocking capacitor 77. This voltage pulse causes the actuation of stage 68, transferring the conductance to the right side and by so doing, raising the potential of conductor 115 and impressing a positive potential on the control electrode of gate stage 65 and increasing the potential of the control electrode to a value which is one or two volts below the cut-off potential. In this condition the gate is said to be open because a positive potential applied over conductor 108 will increase the potential of the control electrode to a value which permits current to flow from the anode to the cathode in stage 65 and a negative pulse will be sent out over conductor 109.

During the time the ninety-first column is in the sensing position, all twelve photoelectric cells are dark and a positive pulse is transmitted over conductor 52 to trigger stage 53, transferring its conductance to the right side. This sends a positive pulse over conductor 108 to gate stage 65 which is now open and a negative pulse is sent over conductor 109 to the left control electrode of stage 66, transferring its conductance to the right side. Just before the ninety-first column passes out of the sensing position the voltage on conductor 63 is reduced to zero and the decoding matrix is de-energized, thereby eliminating the voltage on conductor 52. This causes trigger stage 53 to be returned to its normal condition.

When the ninety-second column appears in the sensing position, slot 41 (Fig. 4) illuminates all six of the photo cells in group 32 and a positive pulse is sent over conductor 50 to trigger stage 51, transferring its conductance to the right side and sending a negative pulse over conductor 111 to trigger stage 66. Conductance of stage 66 is transferred from the right to the left side and at the same time a carry pulse is sent over conductor 112 to actuate trigger stage 67 and cause its conductance to be transferred to the right side. Near the end of this time interval, stage 51 is normalized.

When the ninety-third column is moved into the sensing position, all the photoelectric cells are in darkness and a positive pulse is again sent over conductor 52 to actuate stage 53 to change its conductance to the right side. As before, a positive pulse is sent over conductor 108 through gate stage 65 and appears as a negative pulse on conductor 109 and actuates trigger stage 66, causing its conductance to be again shifted from left to the right. During this time interval, neither stages 67 or 68 are actuated. As the column position 93 moves away from the sensing position, stage 53 is normalized.

When the ninety-fourth column is moved to the sensing position, the six photoelectric cells in group 35 all receive illumination and a positive pulse is transferred over conductor 50 to stage 51, thereby sending a negative pulse again over conductor 111 to stage 66, transferring its conductance back to normal and sending a carry pulse over conductor 112 to trigger stage 67, transferring its conductance back to the normal or left side. This in turn sends a negative pulse over conductor 113 to the third trigger stage 68 which has been conducting on the right side since its first actuation by the negative voltage on segment 73. Stage 68 is actuated and returned to the left or normal condition, thereby applying a negative voltage on conductor 115 which will lower the potential on the control electrode of gate stage 65 sufficiently to close the gate and not permit subsequent conduction.

When the ninety-fifth column is moved to the sensing position, all twelve photoelectric cells are in darkness and a positive pulse is again sent over conductor 52 to actuate stage 53 and change its conductance to the right. At this time, gate stage 65 is closed and nothing further happens.

During the normal sensing of the data card, amplifier stage 70 is conducting current between the anode and cathode. This conduction is due to the fact that the control electrode of stage 70 is above the cut-off voltage since conductor 122 receives a positive potential from the third trigger stage 68. Because of the conduction in stage 70, relay winding 71 carries current and contacts 72 are held open. When trigger stage 68 is actuated and its conductance is transferred to the right, a lowered potential appears on conductor 122 and amplifier stage 70 is rendered non-conducting and the current in coil 71 is reduced to zero. The actuation of trigger stage 68 occurs during the sensing of column 91 and this condition prevails until column 94 when a full count of four periods transfers conductance in stage 68 back to normal and conduction through stage 70 is resumed. If relay 71, 72 were a fast acting relay, contact 72 would be broken and the signal 120 would be energized or clutch 121 would be disconnected. However, a delayed action is built into the relay and contact 72 will not open for the short period of time which is consumed in sensing columns 91, 92, and 93. This delayed action is necessary to keep the machine running and to show no signal which would otherwise designate an error in the sensing circuit. In case one of the photoelectric cells does not produce current when it is illuminated or produces a current when it has no illumination, then a full count of four will not be received by the three trigger circuits 66, 67, and 68 and the last trigger circuit 68 will not be normalized to conduct on the left side. This condition retains stage 70 in its non-conducting condition and contacts 72 will be made a short time after the next card has started through the first sensing position. Then the signal circuit 120 will be energized and the clutch 121 will be disengaged.

Figure 8:
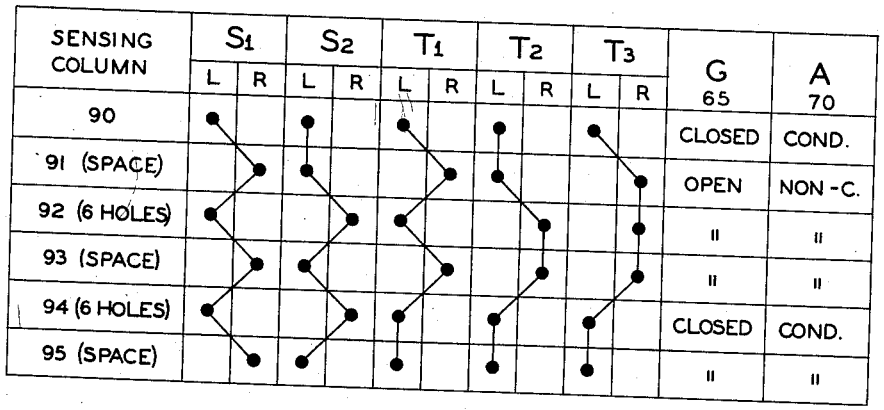
Fig. 8 is a chart which indicates the conductivity of the two input trigger circuits and the three counting trigger circuits which make up the pulse counting circuit.

Fig. 8 is a chart showing the position of conductivity in the five trigger stages and also designating the condition of gate stage 65 and amplifier stage 70.

Figure 9:
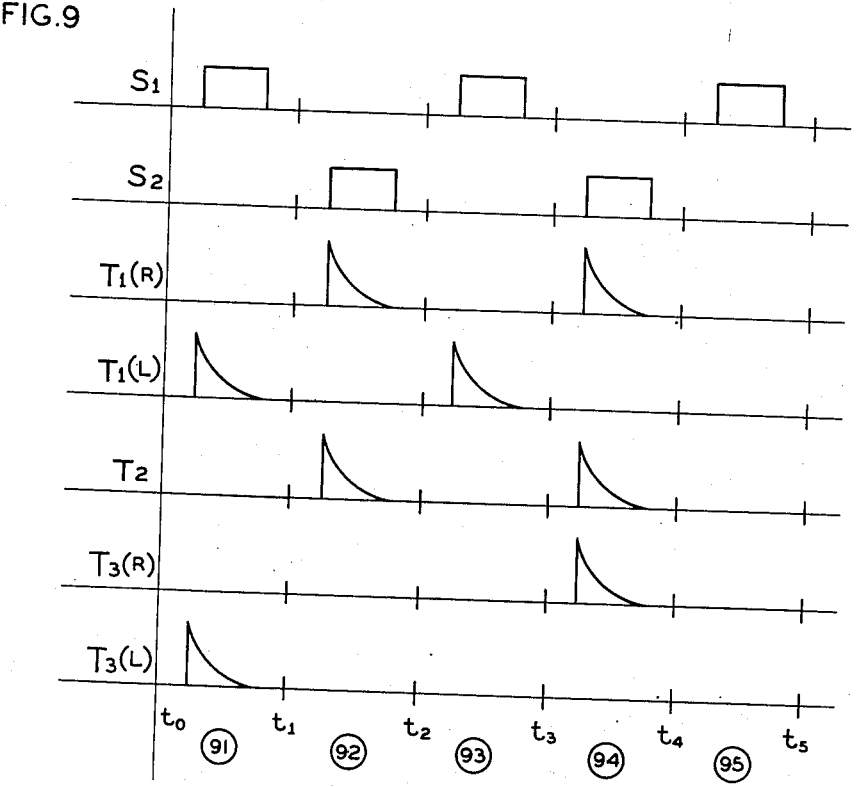
Fig. 9 is a graph showing voltage pulses as applied to the various trigger circuits.

Fig. 9 further illustrates the operation and the condition of the trigger stages by showing the pulses received by the stages in order to operate them. The pulses received by Schmitt trigger stages S1 and S2 are positive pulses. All the other operating pulses are negative. In the above description pulse counting was done by trigger circuits because of their speed of operation and because of their reliability. However, it will be obvious that a similar counting arrangement could have beeen performed by relay circuits, such counting circuits being old in the art. The gate stage 65 could also be replaced by a relay circuit.

While there have been described and illustrated, specific embodiments of the invention, it will be obvious that various changes and modifications may be made therein without departing from the field of the invention which should be limited only by the scope of the appended claims.

What is claimed is:

1. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a pulse responsive circuit connected to said decoding circuit for receiving said first and second electric pulses; and a signal circuit connected to the pulse responsive circuit for producing a signal whenever the pulse responsive circuit does not receive all of said pulses.

2. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a pulse responsive circuit connected to said decoding circuit for receiving said first and second electric pulses; and a signal circuit connected to the pulse responsive circuit for producing a signal whenever the pulse responsive circuit fails to transmit all of the pulses corresponding to the cycles of luminous energy.

3. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a counting circuit connected to the decoding circuit for counting said first and second electric pulses; and a signal circuit connected to the counting circuit for producing a signal whenever the counting circuit does not count all of said periods.

4. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a counting circuit connected to the decoding circuit and including a series of electronic trigger stages for counting said first and second electric pulses; and a signal circuit connected to the counting circuit for producing a signal whenever the counting circuit does not count all of said periods.

5. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a counting circuit for counting said first and second electric pulses; said counting circuit comprising, a gate stage which transmits counting pulses only when open, a series of trigger stages connected to the gate stage, and means for opening the gate stage at the start of said cycles of luminous energy; and a signal circuit connected to the counting circuit for producing a signal whenever the counting circuit does not count all of said periods.

6. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a counting circuit for counting said first and second electric pulses; said counting circuit comprising, a gate stage which transmits counting pulses only when open, a series of trigger stages connected to the gate stage, and a commutator connected between the gate stage and a source of potential for opening the gate stage at the start of said cycles of luminous energy; and a signal circuit connected to the counting circuit for producing a signal whenever the counting circuits does not count all of said periods.

7. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a counting circuit for counting said first and second electric pulses; said counting circuit comprising, a gate stage which transmits counting pulses only when open, a series of trigger stages connected to the gate stage, and a commutator connected between the gate stage and a source of potential for opening the gate stage at the start of said cycles of luminous energy; a signal circuit connected to the counting circuit for pro-
ducing a signal whenever the counting circuit does not count all of said periods; and means for closing the gate stage when all of said periods have been counted.

8. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a counting circuit for counting said first and second electric pulses; said counting circuit comprising, a series of trigger stages connected in a counting arrangement and receiving input pulses through a gate stage, a connection between one of the trigger stages and the gate stage whereby the gate stage is opened when said trigger stage is actuated and the gate stage is closed when the trigger stage is normalized; a commutator connected between said trigger stage and a source of potential for actuating the trigger stage at the start of said cycles of luminous energy; a signal circuit connected to the counting circuit for producing a signal whenever the counting circuit does not count all of said periods; and counting circuit means for normalizing said trigger stage and closing the gate stage when all of said periods have been counted.

9. A photoelectric checking system for determining the workability of a series of photoelectric cells comprising; means for applying one or more cycles of luminous energy to said cells, each cycle including a period of light and a period of darkness; an amplifying and decoding circuit connected to said series of cells for producing a first electric pulse when all of said cells are conducting, and for producing a second electric pulse when all of said cells are non-conducting; a counting circuit for counting said first and second electric pulses; said counting circuit comprising, an input circuit connected through a gate stage, a series of trigger stages connected to the input circuit and including an output trigger stage connected to a signal circuit, a connection between the output trigger stage and the gate stage to open the gate stage whenever the output stage is actuated and to close the gate stage when the output stage is normalized; means for actuating the output trigger stage at the start of said cycles of luminous energy; a signal circuit connected to the counting circuit for producing a signal whenever the counting circuit does not count all of said periods; and a counting circuit connection for sending an electrical pulse to the output trigger stage to normalize it when all of said periods have been counted.

10. A photoelectric checking system for determining the workability of a series of photoelectric cells arranged in two sensing groups comprising; means for sequentially applying a cycle of luminous energy to each group of cells, each cycle including a period of light and a period of darkness; an amplifying and translating circuit connected to said groups of photoelectric cells for producing a first electric pulse when all the cells in either group are conducting, and for producing a second electric pulse when all cells in both groups are non-conducting; a pulse responsive circuit connected to said translating circuit for receiving said first and second electric pulses; and a signal circuit connected to the pulse responsive circuit for producing a signal whenever the pulse responsive circuit does not receive all of said pulses.

11. A photoelectric checking system for determining the workability of a series of photoelectric cells arranged in two sensing groups comprising; means for sequentially applying a cycle of luminous energy to each group of cells, each cycle including a period of light and a period of darkness; an amplifying and translating circuit connected to said groups of photoelectric cells for producing a first electric pulse when all the cells in either group are conducting, and for producing a second electric pulse when all cells in both groups are non-conducting; a pulse responsive circuit connected to said translating circuit for receiving said first and second electric pulses; and a signal circuit connected to the pulse responsive circuit for producing a signal whenever the pulse responsive circuit fails to transmit all of the pulses corresponding to the cycles of luminous energy applied to both groups of photoelectric cells.

12. A photoelectric checking system for determining the workability of a series of photoelectric cells arranged in two sensing groups comprising; means for sequentially applying a cycle of luminous energy to each group of cells, each cycle including a period of light and a period of darkness; an amplifying and translating circuit connected to said groups of photoelectric cells for producing a first electric pulse when all the cells in either group are conducting, and for producing a second electric pulse when all cells in both groups are non-conducting; a counting circuit connected to the translating circuit for counting the first and second electric pulses from each group; and a signal circuit connected to the counting circuit for producing a signal whenever the counting circuit fails to count all the periods from both groups of cells.

References Cited in the file of this patent

UNITED STATES PATENTS

| Number | Name | Date |
| --- | --- | --- |
| 2,231,186 | Gould | Feb. 11, 1941 |
| 2,473,314 | Toulon | June 14, 1949 |
| 2,563,274 | Rendel | Aug. 7, 1951 |